United States Patent
Weber (10) Patent No.: US 10,896,298 B2
(45) Date of Patent: Jan. 19, 2021

(54) SYSTEMS AND METHODS FOR CONFIGURING AN AUTOMATIC TRANSLATION OF SIGN LANGUAGE IN A VIDEO CONFERENCE

(71) Applicant: VERIZON PATENT AND LICENSING INC., Basking Ridge, NJ (US)

(72) Inventor: Emmanuel Weber, El Dorado Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 127 days.

(21) Appl. No.: 16/209,773

(22) Filed: Dec. 4, 2018

(65) Prior Publication Data

US 2019/0171716 A1 Jun. 6, 2019

Related U.S. Application Data

(60) Provisional application No. 62/594,206, filed on Dec. 4, 2017.

(51) Int. Cl.
*G06F 40/58* (2020.01)
*G06K 9/00* (2006.01)
(Continued)

(52) U.S. Cl.
CPC ............ *G06F 40/58* (2020.01); *G06F 40/51* (2020.01); *G06K 9/00355* (2013.01); *H04N 7/147* (2013.01); *H04N 7/15* (2013.01)

(58) Field of Classification Search
CPC ..... G06F 40/58; G06F 40/51; G06K 9/00355; H04N 7/15
See application file for complete search history.

(56) References Cited

U.S. PATENT DOCUMENTS 6,477,239 B1 * 11/2002 Ohki .................... G09B 21/009
348/14.01
8,493,174 B2 7/2013 Agrawal
(Continued)

FOREIGN PATENT DOCUMENTS

KR 100730573 B1 6/2007

OTHER PUBLICATIONS

Stein; et al., "Hand in Hand: Automatic Sign Language to English Translation", Paper (2007), 7 pages.
(Continued)

*Primary Examiner* — Thomas H Maung (57) ABSTRACT

A user interface is presented for a hearing-impaired user to make selections that influence how that user participates in a video conference and how other participants in that video conference interact with the hearing-impaired user. For example, through appropriate user interface selections, the hearing-impaired user may specify that he/she is to always preview (for editing purposes, etc.) any sign language translations made by a video conferencing system before those translations are released to the other participants, whether as text and/or speech. Through other user interface selections, the user may configure linguistic and/or playback characteristics associated with the sign-language-to-speech translations, with speech signals being produced so as to include certain effects when played out at the endpoints of the other participants and/or emulate a desirable video conference persona from the standpoint of the hearing-impaired user.

16 Claims, 7 Drawing Sheets

(51) Int. Cl.
  *H04N 7/14*   (2006.01)
  *H04N 7/15*   (2006.01)
  *G06F 40/51*  (2020.01)

(56) References Cited

U.S. PATENT DOCUMENTS

| | | | |
|---|---|---|---|
| 8,751,215 | B2 | 6/2014 | Tardif |
| 9,798,722 | B2 | 10/2017 | Michaelis |
| 10,176,366 | B1* | 1/2019 | Maxwell ............ G06K 9/00355 |
| 2010/0027765 | A1 | 2/2010 | Schultz et al. |
| 2010/0142683 | A1 | 6/2010 | Goldman et al. |
| 2011/0274311 | A1 | 11/2011 | Lee et al. |
| 2012/0182384 | A1 | 7/2012 | Anderson et al. |
| 2016/0042228 | A1* | 2/2016 | Opalka ............ G06K 9/00389 |
| | | | 382/103 |
| 2018/0048859 | A1 | 2/2018 | Episkopos et al. |

OTHER PUBLICATIONS

Yang; et al., "Robust sign language recognition by combining manual and non-manual features based on conditional random field and support vector machine", Pattern Recognition Letters (2013), 34:2051-2056.

Yang; et al., "Sign Language Recognition with the Kinect Sensor Based on Conditional Random Fields", Sensors (2015), 15:135-147.

Zafrulla, "Automatic Recognition of American Sign Language Classifiers", Thesis paper (May 2014), Georgia Institute of Technology, 134 pages.

\* cited by examiner

SYSTEMS AND METHODS FOR CONFIGURING AN AUTOMATIC TRANSLATION OF SIGN LANGUAGE IN A VIDEO CONFERENCE

RELATED APPLICATIONS

This application is a non-provisional patent application of and claims priority to U.S. Provisional Application No. 62/594,206, filed 4 Dec. 2017, which is incorporated by reference herein.

FIELD OF THE INVENTION

The present invention is directed to providing a video conference system that includes facilities for automatic translation of sign language, and in particular, such systems that employ user interfaces for hearing-impaired users to preferentially select aspects, features, and/or properties of such systems so as to customize user experiences during video conferences making use of the systems.

BACKGROUND

A number of researchers have made advances in the field of automatic translation of sign language. These include systems for automatically translating sign language to text and others for translating sign language to speech. For example, Stein et al. have described automatic translation of sign language into spoken language using statistical machine translation methods. See D. Stein et al., "Hand in Hand: Automatic Sign Language to English Translation," 11*th Conference on Theoretical and Methodological Issues in Machine Translation* (*TMI*-07), pp. 214-220, Skövde, Sweden (September 2007). Microsoft Corp.'s KINECT™ sensor system has been used in connection with an automatic sign language-to-text translation system. See Z. Zafrulla et al., "American sign language recognition with the kinect," *Proc. 13th Int'l. Conf. on Multimodal Interfaces*, Alicante, Spain, pp. 279-286 (2011). Other efforts in this area have been reported as well. See, e.g., H.-D. Yang and S.-W. Lee, "Robust sign language recognition by combining manual and non-manual features based on conditional random field and support vector machine," *Pattern Recognition Letters*, v. 34, no. 16, pp. 2051-2056 (2013). Among the systems employed for such activities are ones using hand- or wrist-based sensors, optical sensors such as cameras, and even RADAR, LIDAR, structured light, and sonar techniques.

SUMMARY OF THE INVENTION

In one embodiment of the invention, a user interface is presented for a hearing-impaired user to make selections that influence how that user participates in a video conference and how other participants in that video conference interact with the hearing-impaired user. For example, through appropriate user interface selections, the hearing-impaired user may specify that he/she is to always preview (for editing purposes, etc.) any sign language translations (e.g., displayed on a display visible to the hearing-impaired user) made by the video conferencing system before those translations are released to the other participants, whether as text and/or speech. Alternatively, only certain portions of the translation may be previewed (e.g., portions translated with a low confidence level, portions with questionable or off-color language, etc.).

Through other user interface selections, the user may configure playback and/or linguistic characteristics associated with the sign-language-to-speech translations, with speech signals being produced so as to include certain effects when played out at the endpoints of the other participants and/or emulate a desirable video conference persona from the standpoint of the hearing-impaired user. The playback characteristic may include at least one of a gender of a simulated speaker or a playback speed. The linguistic characteristic may include at least one of an accent of the simulated speaker, a pronunciation of words by the simulated speaker, a prosody of speech from the simulated speaker, or a choice of vocabulary by the simulated speaker.

In addition, a calibration procedure may be performed to configure a system (e.g., machine learning system) before it is used (and/or during its use). Such configuration may include a brief training session during which the user is asked to sign several known words, phrases, etc., for calibration of the system, much in the same way a speech-to-text system is trained by a user before or during a dictation session. In this way, the server-based translation components of the system can be tuned to the particular user's manner of signing and/or the user can be provided instruction for ensuring better capture of his/her signing. For example, the user may need to be coached to perform the signing within the field of view of one or more cameras and/or other sensors, or while using specified instruments such as data gloves, etc.

These and other embodiments of the invention are more fully described in association with the drawings below.

DETAILED DESCRIPTION OF THE INVENTION

Embodiments of apparatuses, computer systems, computer readable mediums, and methods for a video conference system that provides for automatic translation of sign language are described.

Video conference systems configured in accordance with embodiments of the present invention may support a variety of feeds of audio, video, audio and video, and/or other media and/or data streams from video conferencing participant endpoints to present a video conference. Endpoints may be any type of device, including, but not limited to: laptop and/or desktop computers, smartphones, tablet computers, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

Interactions by and among participants in a video conference encompass the control of a video conference session, its configuration, the visual layout of the data streams from the conference participants, customization of the user interface, and adaptation of a video conference to integrate with and present data streams from different client applications. As a non-limiting example, one such use of the video conference system is to facilitate conferences between two disparate endpoints such as a client application for a proprietary system from a communication service provider (e.g., a Microsoft SKYPE™ client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

Figure 1:
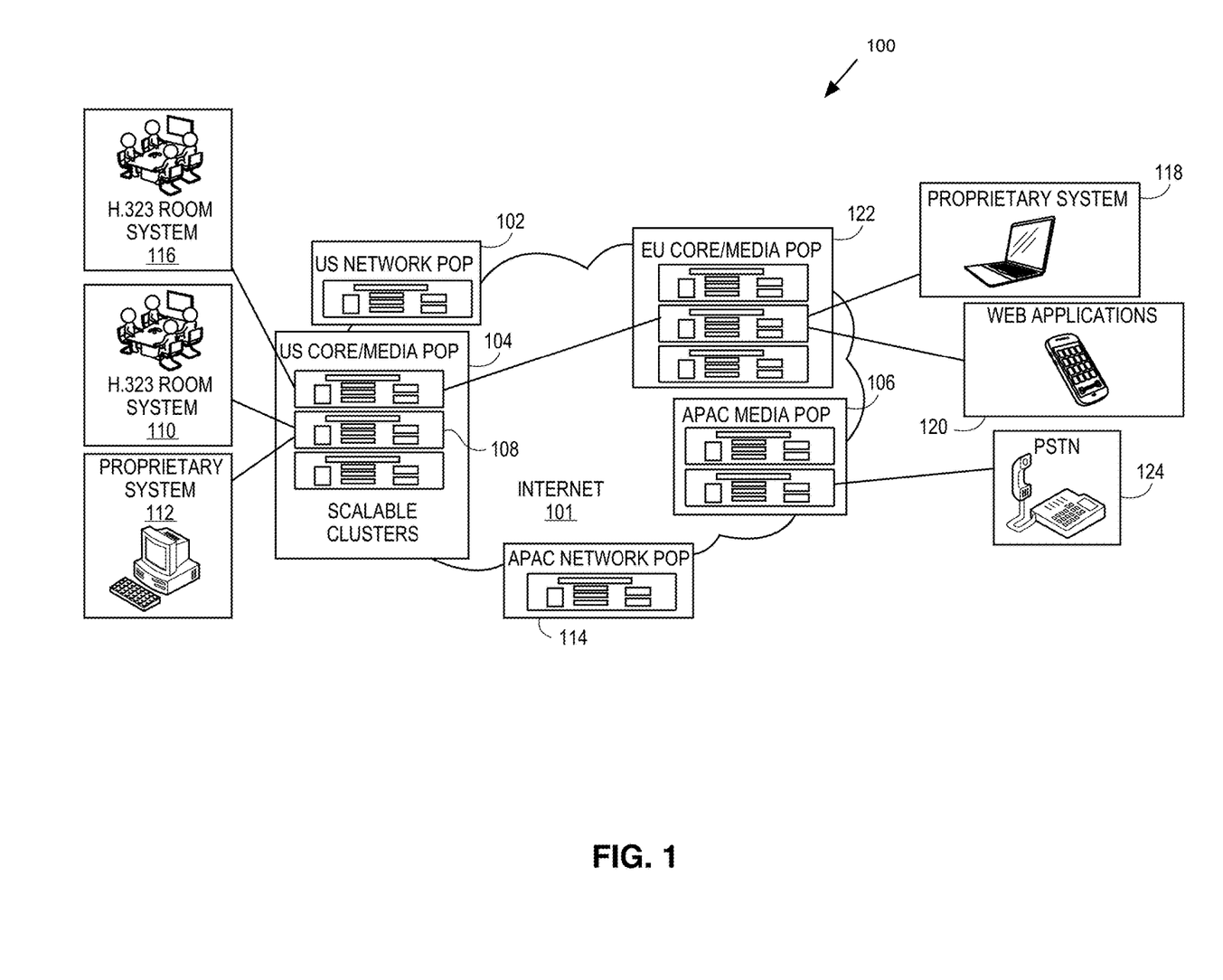
FIG. 1 depicts an exemplary video conferencing system in accordance with some embodiments of the invention.

FIG. 1 depicts an exemplary video conferencing system 100, in accordance with some embodiments of the invention. The video conferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as an MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of microprocessor-based servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running Skype or Microsoft LYNC™ (as shown with 112), etc.

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft LYNC that require federation (i.e. cooperation among multiple organizational entities) at edge nodes and translation and decoding of several communication and transport protocols.

Figure 2:
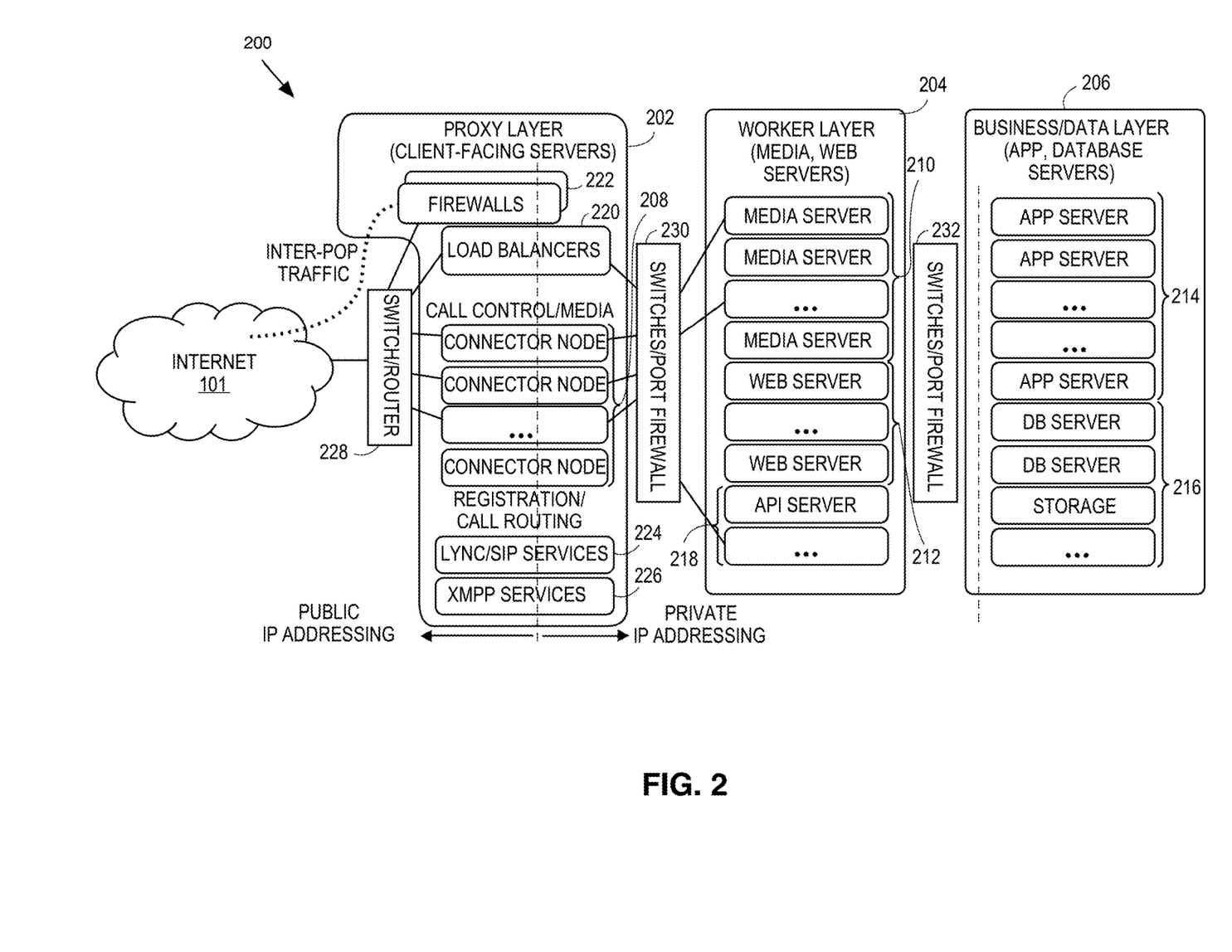
FIG. 2 depicts an exemplary point of presence (POP) media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) in this context may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces. One or more application servers 214 may also facilitate automated sign language-to-text and/or sign language-to-speech translation, as discussed herein. Such translation(s) may be provided in any language and for any signing convention, for example using methods such as those discussed in the above-referenced publications. In general, such translations rely on considering and recognizing finger and/or hand shapes and/or motions, as well as, in some instances, body motions, and/or facial expressions. The present invention relies on known techniques for translating sign language to text and/or speech, but introduces such activities in the context of video conferences. Along with providing these facilities in this context, and preferably via cloud-based server translation components rather than endpoints, the present invention also introduces user interfaces for use at video conference endpoints used by hearing-impaired users. Such user interfaces allow the hearing-impaired user to make selections that will influence how that user participates in a video conference and how other participants in that video conference interact with the hearing-impaired user. For example, through appropriate user interface selections, the hearing-impaired user may specify that he/she is to always preview (for editing purposes, etc.) any sign language translations made by the video conferencing system before those translations are released to the other participants, whether as text and/or speech. Alternatively, the hearing-impaired user may specify that only those translations which the video conferencing system assesses do not meet a threshold confidence level of accuracy are previewed (for editing, etc.) before being released to the other participants. Or, in some instances, the hearing-impaired user may specify that only those translations which the video conferencing system assesses contain questionable or off-color language are previewed (for editing, etc.) before being released to the other participants.

In addition to such features, user interfaces configured in accordance with embodiments of the present invention may allow a hearing-impaired user to specify sign-language-to-speech translations, with speech signals being produced so as to include certain effects when played out at the endpoints of the other participants. For example, hearing-impaired users may select qualities such as gender, accent, speed, pronunciation, prosody, and/or other linguistic characteristics, so as to emulate a desirable video conference persona from the standpoint of the hearing-impaired user. In some cases, even idiosyncrasies such as the use of certain vocabulary can be selected through the user interface. To that end, the video conferencing system may be provisioned with a stored user profile for a hearing-impaired user that includes previous selections of the user with respect to such items. Upon joining the video conference, or as part of the connection process, the hearing-impaired user may be offered the choice to use the stored profile parameters during the video conference, or to change same (either for the current video conference only, or for the current and future video conferences) through new/further selections of options. Because hearing-impaired users may not have experience with making these kinds of choices concerning their "voice" for a video or teleconference, and may be incapable of personally assessing the effect of different selections on the ultimate voice produced, an instructive tutorial or "wizard" may be used to afford the hearing-impaired user a chance to make informed selections. User profiles of this nature may be stored at one or more application servers or data stores accessible thereto, at endpoints, or on portable media which the hearing-impaired user may use to upload a profile when using a video conference endpoint.

Figure 3:
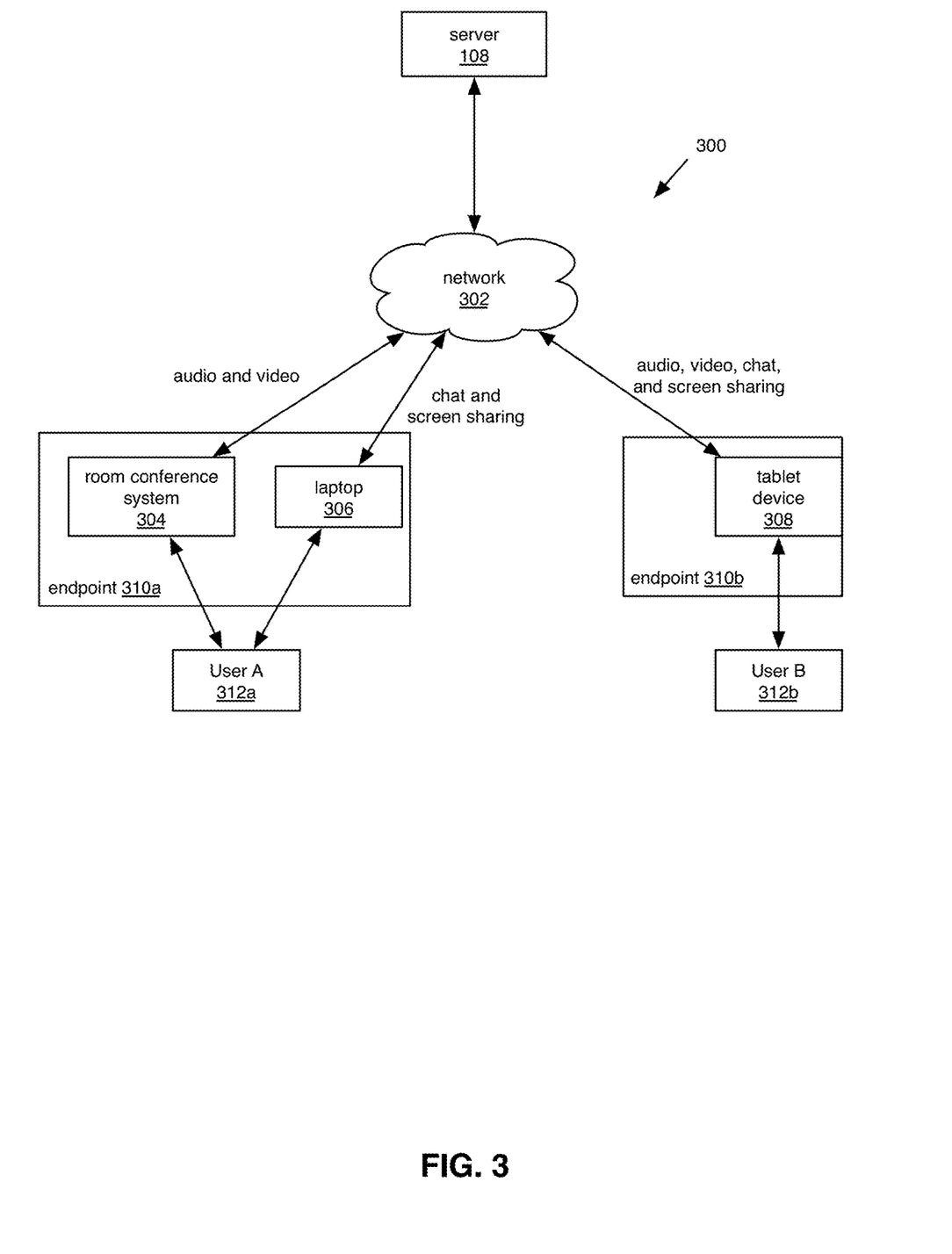
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet computing device or laptop computer that can be used for screen sharing, and (iii) a smartphone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

Server 108 may support a set of capabilities, such as audio, video, chat, screen sharing and the like, for each user or selected users. In one embodiment of the invention, server 108 may also support automatic translation of sign language to speech and/or text, for example according to a video feed from one of endpoints 310a, 310b, provided by a hearing-impaired user 312a, 312b. The sign language-to-text and/or sign language-to-speech conversion may be facilitated by any known method for same, for example those described in the above-referenced publications. By instantiating the sign language-to-text and/or sign language-to-speech conversion facilities in a server, e.g., a cloud-based server, users are relieved from the need for specialized endpoint equipment and may use conventional web cameras and the like to capture sign language gestures. Alternatively, or in addition, endpoints that incorporate other sensors, such as data gloves, accelerometers, or other hand, finger, facial expression, and/or body movement tracking sensors may be used, and the data collected thereby provided as part of the feed to server 108 for use in translating the sign language to text and/or to speech.

In some embodiments, a hearing-impaired user can join a video conference with a first device that is capable of supporting video and a second device that is better suited for providing a data feed from one or more sensors used to capture sign language gestures, facial expressions, etc. Server 108 may associate the user with both the first and second devices, and consequently can determine the communication modes (i.e., video, data sharing, etc.) that are associated with that user. Server 108 may be a component of video conferencing system 100, such as a server of POP media processing node architecture 200. Network 302 may be a WAN, the Internet, a telecommunications network, a LAN, or the like.

Figure 4:
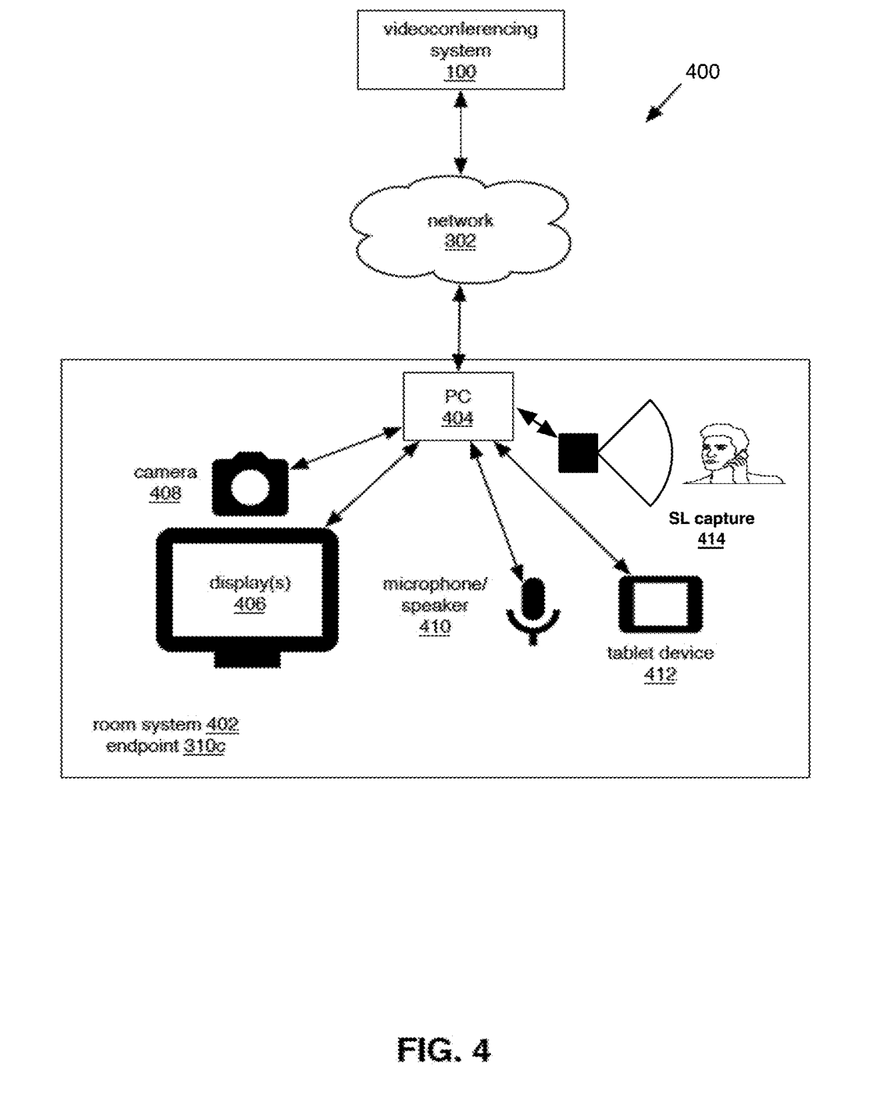
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer 404, one or more displays 406, a camera 408, a microphone and speaker 410, and a tablet device 412. Also included is a sign language capture component 414. In various embodiments, sign language capture component 414 may include hand- or wrist-based sensors, optical sensors such as cameras, RADAR, LIDAR, structured light, and/or sonar sensors, and/or other components for the capture of sign language and, optionally, associated facial expressions and/or body movements.

Personal computer 404 may act as a hub for mediating data communications between some or all of the components of the room system endpoint 310c, and may be, for example, a small form-factor computer such as a Mac Mini or an Intel NUC (Next Unit of Computing) computer. Display(s) 406 may be a television, a monitor, or a projector and projector screen or white board. The microphone and speaker may be contained in a single device or multiple devices; in certain embodiments, the room system 402 may include multiple microphones and speakers, or none at all. Tablet computing device 412 (alternatively, another mobile device such as a smartphone) may provide a user interface for configuring and/or controlling the video conferencing experience at room system 402.

Figure 5:
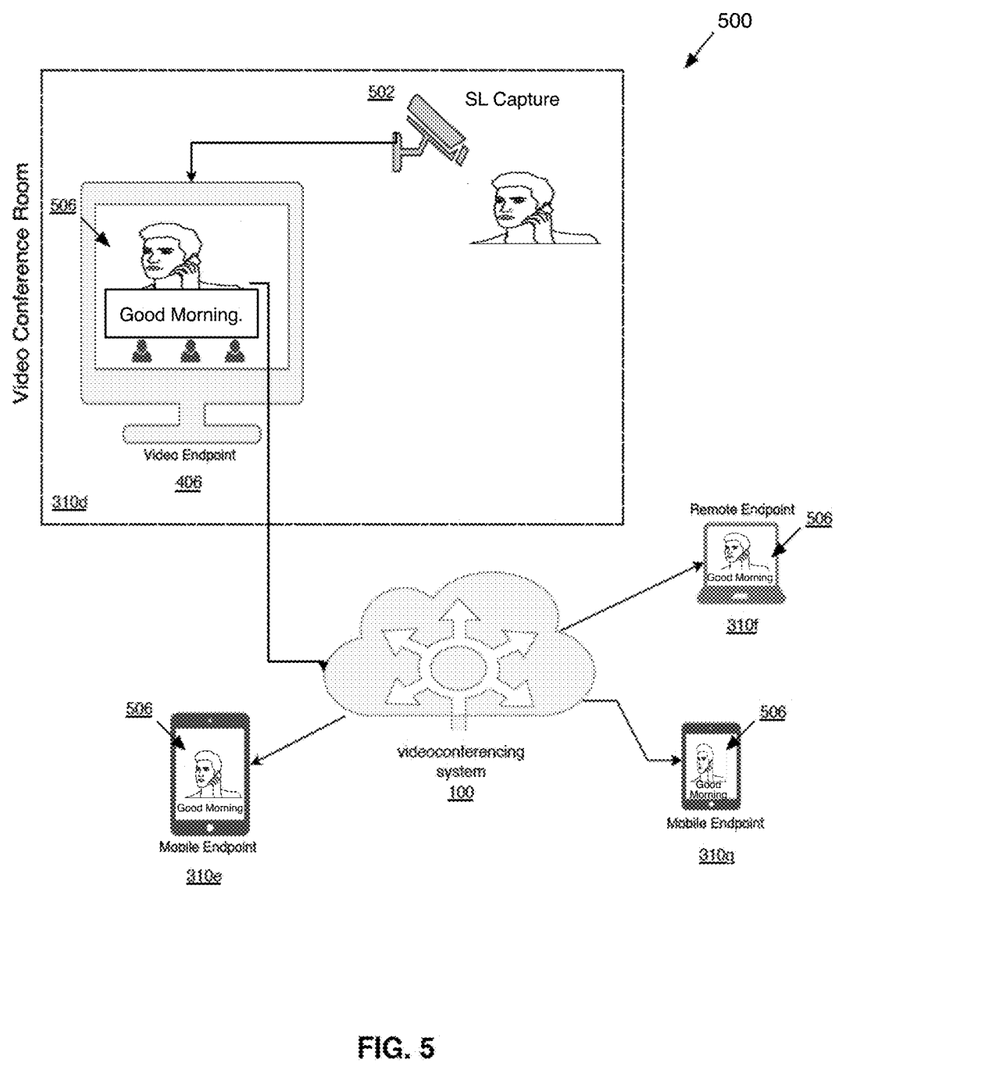
FIG. 5 depicts exemplary components of a video conferencing system in accordance with some embodiments of the invention.

FIG. 5 shows components of an exemplary video conferencing system 500 in which one endpoint 310d includes a room system with a display 406 and a sign language capture system 502. Other devices associated with endpoint 310d (not depicted in FIG. 5) may include, for example, a collection of devices within a physical room associated with the endpoint, such as room system 402, PC 404, camera 408, a microphone and/or speaker 410, and tablet device 412. In certain embodiments, display 406 may be the display of a laptop or tablet computer. In certain embodiments, sign language capture system 502 is associated with a separate endpoint from the video endpoint of display 406, and in other embodiments, sign language capture system 502 and display 406 are associated with the same endpoint 310d. In certain embodiments, sign language capture system 502 may be permanently mounted within the room, and in other embodiments, sign language capture system 502 may be mounted on a tripod or be otherwise moveable.

Sign language capture system 502 is configured to capture hand and finger gestures and shapes, and, optionally, facial expressions and/or body movements, made by a hearing-impaired user, and provide a video and/or data feed representing those captures to video conferencing system 100 (e.g., one or more applications servers associated therewith). For example, video information along with sensor data from accelerometers, data gloves, etc. may be provided to the video conference system servers for automated translation. In certain embodiments, sign language capture system 502 includes one or more processors configured to remove noise from captured image sequences, such as a transient image of a human hand in the act of signing. In certain embodiments, sign language capture system 502 is in communication with display 406 via a local PC 404 (not shown) on a local area network (e.g., using wired (e.g., Ethernet) and/or wireless (e.g., Wi-Fi) connections). This allows the user to monitor the images being transmitted so as to ensure they are being properly captured. In certain embodiments, sign language capture system 502 is in communication with local display 406 via a video conferencing infrastructure such as video conferencing system 100.

In some embodiments, automated translations may be provided by video conferencing system 100 to display 406 for review and editing by the hearing-impaired user. When satisfied, that user may then transmit the translation to other participants in the video conference. Often, the translations will be provided as text, as shown in the illustration. However, in some instances, the translations may be transmitted as audio information, to be played out over speakers at the endpoints used by the other participants. In such instances, the hearing-impaired user may determine the nature of the audio signals to be so played, for example, selecting playback qualities such as gender, accent, etc. that will influence how the hearing-impaired user's "voice" will be played out at the other participants' respective endpoints.

FIG. 5 additionally shows three remote endpoints—mobile endpoints 310e and 310g, and remote laptop endpoint 310f. As shown, the remote endpoints are in communication with sign language capture system 502 via video conferencing system 100. Displays at each endpoint associated with a video conference (e.g., the respective displays of mobile devices at endpoints 310e and 310g and laptop 310f) may present images 506 of the hearing impaired-user, along with the translated text, and/or may play out the translated audio information as speech.

The sign language capture system 502 may include a user interface for the hearing-impaired user to configure the system before it is used (and/or during its use). Such configuration may include a brief training session during which the user is asked to sign several known words, phrases, etc., for calibration of the system, much in the same way a speech-to-text system is trained by a user before or during a dictation session. In this way, the server-based translation components of the system can be tuned to the particular user's manner of signing and/or the user can be provided instruction for ensuring better capture of his/her signing. For example, the user may need to be coached to perform the signing within the field of view of one or more cameras and/or other sensors, or while using specified instruments such as data gloves, etc. Also, the user may be asked to sign at slower than usual speeds so as to ensure all of his/her words are captured and understood. In addition to providing training opportunities for the system and/or the user, the user interface for the sign language capture system 502 may also include user-selectable settings for the language of translation, signing convention being used (e.g., American Sign Language vs. other conventions), sign language-to-speech attributes such as gender, accent, etc., whether or not approval of translations is desired before they are sent to other participants, etc.

Figure 6:
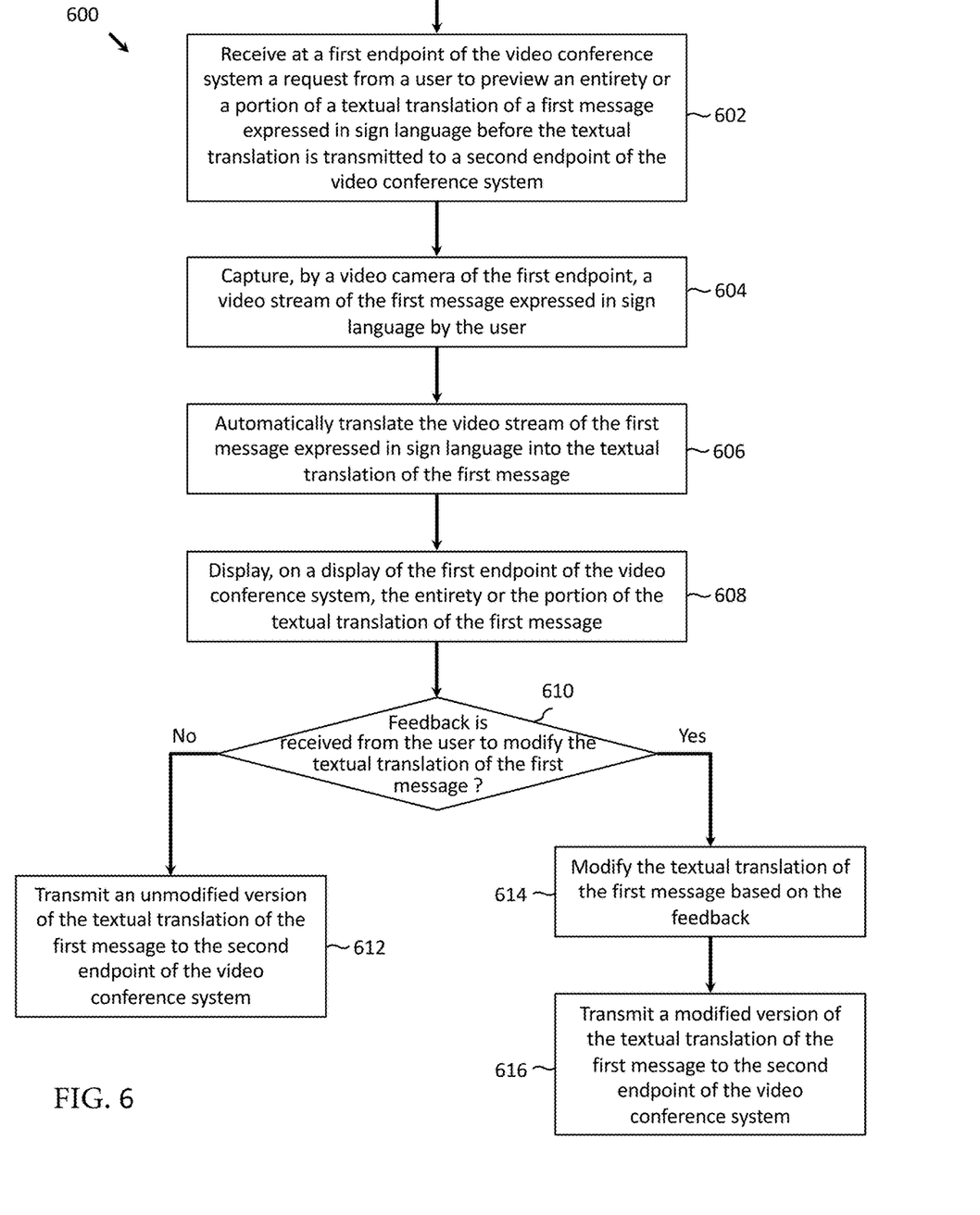
FIG. 6 depicts a flow diagram of a process to capture, at a first endpoint, a video stream of a message expressed in sign language, automatically translate the video stream of the message into a textual translation of the message, and transmit the textual translation of the message to a second endpoint.

FIG. 6 depicts flow diagram 600 of a process to capture, at a first endpoint of the video conference system, a video stream of a message expressed in sign language (and/or data from sensors), automatically translate the video stream of the message (along with sensor data) into a textual translation of the message, and transmit the textual translation of the message to a second endpoint of the video conference system.

At step 602, the first endpoint may receive a request from a hearing-impaired user (or a user assisting the hearing-impaired user) to preview an entirety or a portion of a textual translation of a first message expressed in sign language before the textual translation is transmitted to a second endpoint. For example, the request from the hearing-impaired user may specify that the preview should include only portions of the textual translation that the video conference system assesses do not meet a threshold confidence level of accuracy. As another example, the request from the hearing-impaired user may specify that the preview should include only portions of the textual translation that the video conference system assesses contain questionable or off-color language.

At step 604, a video camera of the first endpoint may capture a video stream of the first message expressed in sign language by the hearing-impaired user. At step 606, the video stream of the first message expressed in sign language may be automatically translated into the textual translation of the first message. Such translation may be performed at the first endpoint or at a cloud-based server which is communicatively coupled to the first endpoint and the second endpoint.

At step 608, the entirety or the portion of the textual translation of the first message may be displayed on a display of the first endpoint of the video conference system. Such display may be in response to the request from the hearing-impaired user to preview the entirety or the portion of the textual translation.

At step 610, the first endpoint may determine whether feedback has been received from the hearing-impaired user (or other user assisting the hearing-impaired user) to modify the textual translation of the first message. If so (following yes branch of step 610), the first endpoint may modify the textual translation of the first message based on the feedback (step 614) and may transmit a modified version of the textual translation of the first message to the second endpoint (step 616). Otherwise, if no feedback is received or if approval of the textual translation of the first message is received from the user (following no branch of step 610), the first endpoint may transmit an unmodified version of the textual translation of the first message to the second endpoint (step 612).

Subsequent to the second endpoint receiving the unmodified or modified version of the textual translation, a speaker of the second endpoint of the video conference system may play an audio translation that has been synthesized based on the unmodified or modified version of the textual translation or display the unmodified or modified version of the textual translation on a display of the second endpoint. The audio translation may be synthesized (by the cloud-based server or the second endpoint) from the modified or unmodified version of the textual translation of the first message in accordance with at least one of a playback or linguistic characteristic received from the hearing-impaired user (or a user assisting the hearing-impaired user).

The playback characteristic may include at least one of a gender of a simulated speaker or a playback speed. The linguistic characteristic may include at least one of an accent of the simulated speaker, a pronunciation of words by the simulated speaker, a prosody of speech from the simulated speaker, or a choice of vocabulary by the simulated speaker. After the playback or linguistic characteristic has been received from the user, the characteristic may be stored in a user profile (stored at any data store of the video conference system), and thereafter may be retrieved whenever an audio translation is synthesized.

For completeness, it is noted that in addition to transmitting the textual translation of the first message to the second endpoint, a video stream of the hearing-impaired user may also be transmitted to the second endpoint, so that participant(s) at the second endpoint may see the hearing-impaired user. This video stream may be identical to or different from the video stream that captures the first message expressed in sign language. If the participant(s) at the second endpoint do not understand sign language, an option may be selected by participants at either endpoint to designate the video stream to be a "face" video stream, which only includes the head and possibly the shoulders of the hearing-impaired user, but mostly excludes the hands of the hearing-impaired user. If the participant(s) at the second endpoint do (or partially) understand sign language, an option may be selected by participants at either endpoint to designate the video stream to be a "body" video stream, which includes the face, hands and body of the hearing-impaired user at the first endpoint.

Such an embodiment may be useful for participant(s) at the second endpoint who may not be entirely proficient in sign language. In instances where the participant(s) at the second endpoint do not fully understand the communicated signs from the hearing-impaired user at the first endpoint, the participant(s) may rely upon the audio or textual translation of the signed message.

Figure 7:
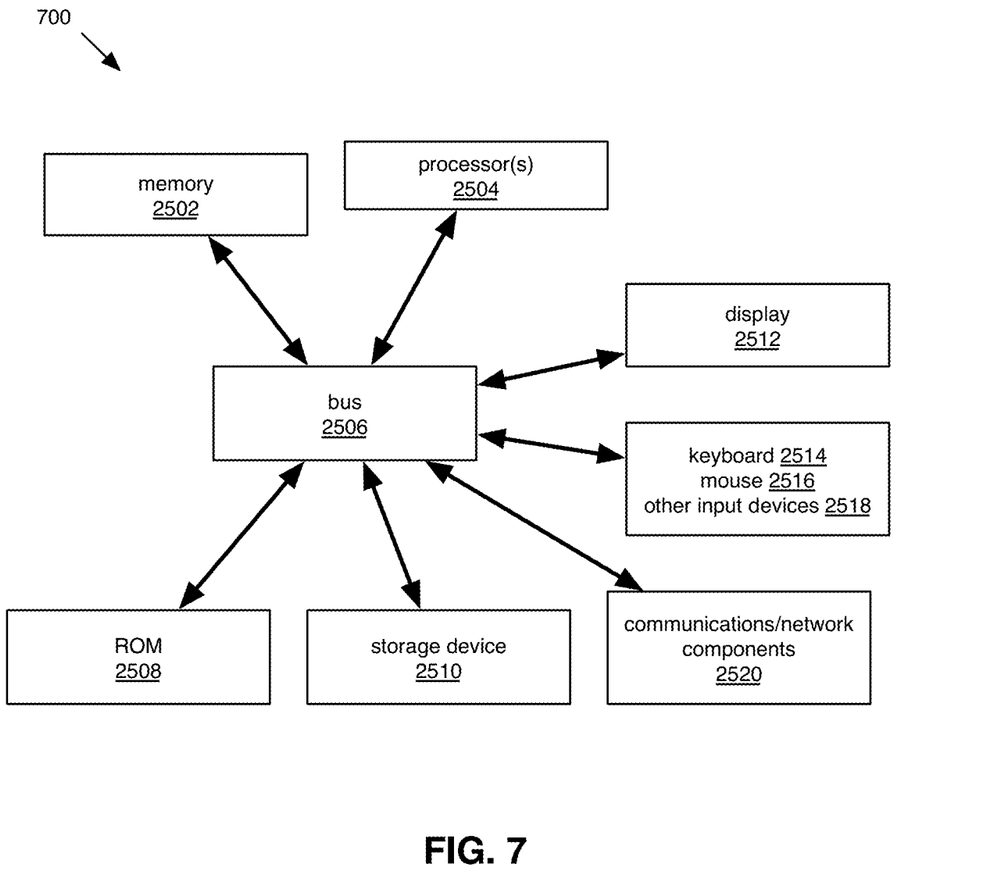
FIG. 7 depicts a block diagram of an exemplary computing system in accordance with some embodiments of the invention.

FIG. 7 is a block diagram showing an exemplary computing system 700 that is representative any of the computer systems or electronic devices discussed herein. Note that not all of the various computer systems have all of the features of system 700. For example, systems may not include a display inasmuch as the display function may be provided by a client computer communicatively coupled to the computer system or a display function may be unnecessary.

System 700 includes a bus 2506 or other communication mechanism for communicating information, and a processor 2504 coupled with the bus 2506 for processing information. Computer system 700 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 700 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 700 may be coupled via the bus 2506 to a display 2512 for displaying information to a computer user. An input device such as keyboard 2514, mouse 2516, or other input devices 2518, such as the sign language capture system 502 discussed above, may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, JavaScript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 700 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for facilitating automatic sign language translation in a video conference system, the method comprising:
    receiving, at a first endpoint of the video conference system, a request from a user to preview one or more portions of a textual translation of a first message expressed in sign language that the video conference system assesses do not meet a threshold confidence level of accuracy, wherein the request is received before the textual translation is transmitted to a second endpoint of the video conference system;
    capturing, by a video camera of the first endpoint of the video conference system, a video stream of the first message expressed in sign language by the user;
    automatically translating the video stream of the first message expressed in sign language into the textual translation of the first message;
    displaying, on a display of the first endpoint of the video conference system, the one or more portions of the textual translation of the first message; and
    if feedback is received from the user to modify the textual translation of the first message, modifying the textual translation of the first message based on the feedback and transmitting a modified version of the textual translation of the first message to the second endpoint of the video conference system; otherwise, if no feedback is received or if approval of the textual translation of the first message is received from the user, transmitting an unmodified version of the textual translation of the first message to the second endpoint of the video conference system;
    receiving at least one of a playback or linguistic characteristic for synthesizing an audio translation, wherein the playback characteristic includes at least one of a gender of a simulated speaker or a playback speed, and wherein the linguistic characteristic includes at least one of an accent of the simulated speaker, a pronunciation of words by the simulated speaker, a prosody of speech from the simulated speaker, or a choice of vocabulary by the simulated speaker;
    synthesizing the audio translation from the modified or unmodified version of the textual translation of the first message in accordance with the at least one of the playback or linguistic characteristic; and
    playing the synthesized audio translation at the second endpoint.

2. The method of claim 1, wherein the request from the user specifies that the preview should include portions of the textual translation that the video conference system assesses contain questionable or off-color language.

3. The method of claim 1, wherein the automatic translation is performed at a cloud-based server of the video conference system, the cloud-based server communicatively coupled to the first endpoint and the second endpoint.

4. The method of claim 1, further comprising storing the at least one of the received playback or linguistic characteristic in a user profile of the user.

5. The method of claim 1, wherein receiving at least one of the playback or linguistic characteristic comprises retrieving the at least one of the playback or linguistic characteristic from a user profile of the user.

6. The method of claim 1, further comprising:
    displaying the modified or unmodified textual translation of the first message on a display of the second endpoint.

7. The method of claim 1, further comprising:
    receiving, at the first endpoint of the video conference system, a request requesting the first message that is expressed in sign language be translated into a particular spoken language.

8. The method of claim 1, wherein the automatic translation is performed at the first endpoint.

9. A video conference system configured to perform automatic translation of sign language, the video conference system comprising
    a first endpoint communicatively coupled to a second endpoint, the first endpoint including a first processor and a first memory storing instructions that, when executed by the first processor of the first endpoint, cause the first processor to perform steps including:
        receiving, at the first endpoint of the video conference system, a request from a user to preview an entirety or a portion of a textual translation of a first message expressed in sign language before the textual translation is transmitted to the second endpoint of the video conference system;
        capturing, at the first endpoint of the video conference system, a video stream of the first message expressed in sign language by the user;
        automatically translating the video stream of the first message expressed in sign language into the textual translation of the first message;
        displaying, on a display of the first endpoint of the video conference system, the entirety or the portion of the textual translation of the first message; and
        if feedback is received from the user to modify the textual translation of the first message, modifying the textual translation of the first message based on the feedback and transmitting a modified version of the textual translation of the first message to the second endpoint of the video conference system; otherwise, if no feedback is received or if approval of the textual translation of the first message is received from the user, transmitting an unmodified version of the textual translation of the first message to the second endpoint of the video conference system;
    the second endpoint including a second processor and a second memory storing instructions that, when executed by the second processor of the second endpoint, cause the second processor to perform steps including:
        receiving at least one of a playback or linguistic characteristic for synthesizing an audio translation, wherein the playback characteristic includes at least one of a gender of a simulated speaker or a playback speed, and wherein the linguistic characteristic includes at least one of an accent of the simulated speaker, a pronunciation of words by the simulated speaker, a prosody of speech from the simulated speaker, or a choice of vocabulary by the simulated speaker;

synthesizing the audio translation from the modified or unmodified version of the textual translation of the first message in accordance with the at least one of the playback or linguistic characteristic; and transmitting the synthesized audio translation to a speaker of the second endpoint.

10. The video conference system of claim 9, wherein the request from the user specifies that the preview should include the entirety of the textual translation of the first message.

11. The video conference system of claim 9, wherein the request from the user specifies that the preview should include only portions of the textual translation that the video conference system assesses do not meet a threshold confidence level of accuracy.

12. The video conference system of claim 9, wherein the request from the user specifies that the preview should include only portions of the textual translation that the video conference system assesses contain questionable or off-color language.

13. The video conference system of claim 9, further comprising instructions that, when executed by the first processor, cause the first processor to store the at least one of the received playback or linguistic characteristic in a user profile of the user.

14. The video conference system of claim 9, wherein receiving at least one of the playback or linguistic characteristic comprises retrieving the at least one of the playback or linguistic characteristic from a user profile of the user.

15. The video conference system of claim 9, further comprising instructions that, when executed by the second processor of the second endpoint, cause the second processor to transmit the modified or unmodified version of the textual translation of the first message to a display of the second endpoint.

16. The video conference system of claim 9, further comprising instructions that, when executed by the first processor, cause the first processor to receive a request requesting the first message that is expressed in sign language be translated into a particular spoken language.

* * * * *